Aug. 28, 1956     H. F. SMITH     2,760,810
FISHING PLUG RETRIEVER
Filed Feb. 25, 1955
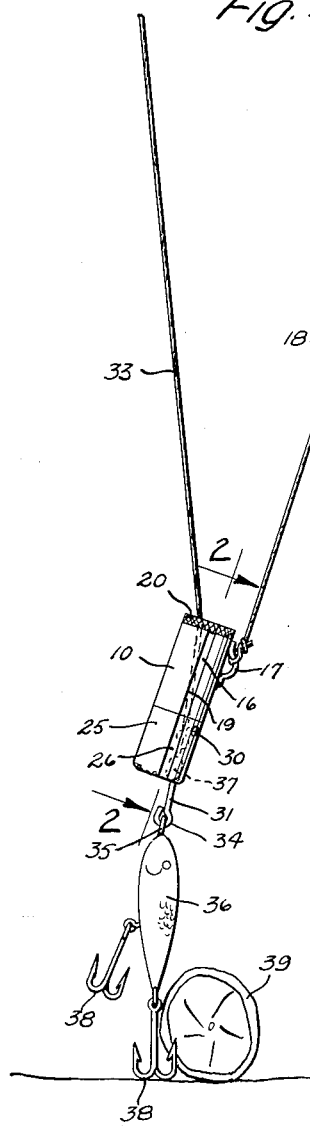
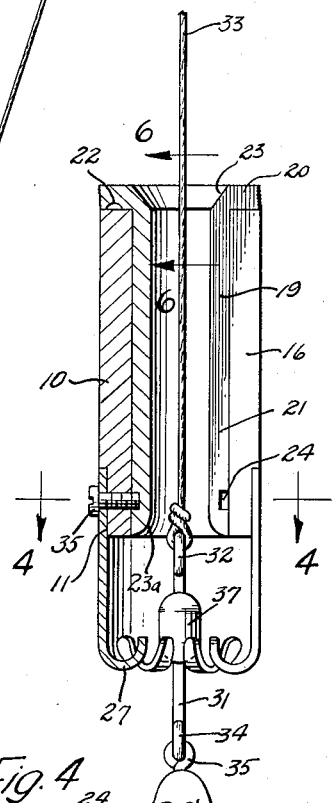
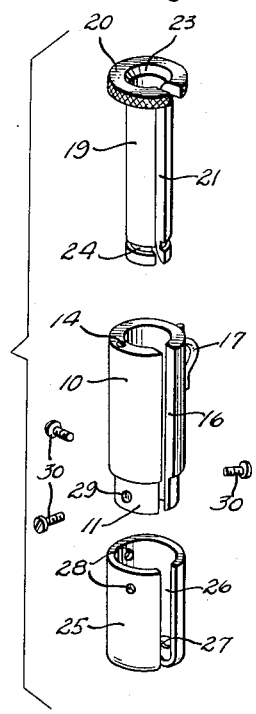
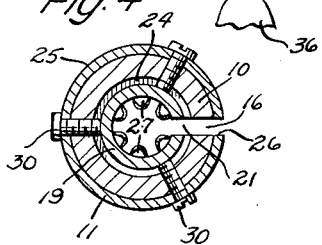
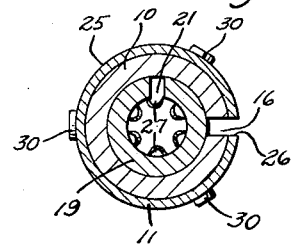
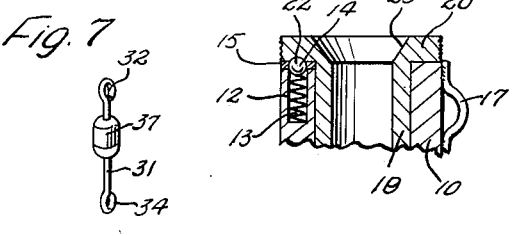
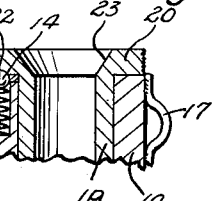
INVENTOR
*Harley F. Smith*

United States Patent Office 2,760,810
Patented Aug. 28, 1956

2,760,810

FISHING PLUG RETRIEVER

Harley F. Smith, Falls Church, Va.

Application February 25, 1955, Serial No. 490,481

6 Claims. (Cl. 294—66)

This invention relates to fishing plug retrievers.

It is an object of the present invention to provide a fishing plug retriever which will permit snared or caught fishing hooks and plugs to be retrieved with a minimum of time and effort.

It is another object of the present invention to provide a fishing plug retriever which may be easily and readily mounted upon the fishing line and safely locked thereon and which cannot escape or come off the fishing line as it makes its way down the line to the snagged lure.

Other objects of the present invention are to provide a fishing plug retriever bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a front elevational view showing a preferred embodiment of the present invention in operative use for retrieving a snagged lure;

Fig. 2 is a longitudinal sectional view thereof on an enlarged scale and taken along the line 2—2 of Fig. 1;

Fig. 3 is an exploded perspective view of certain of the parts comprising the invention;

Fig. 4 is a transverse sectional view taken along the line 4—4 of Fig. 2 and showing the locking sleeve in an open position relative to the body portion for receiving the fishing line therewithin;

Fig. 5 is a view similar to Fig. 4 but showing the locking sleeve displaced relative to the body so as to lock the fishing line within the device;

Fig. 6 is a fragmentary vertical sectional view taken along the line 6—6 of Fig. 2; and Fig. 7 is a perspective view of another of the parts comprising the invention.

Referring now more in detail to the drawing, 10 represents a hollow cylindrical body portion open at both ends, the lower end of the body portion 10 being provided with an annular recess 11, substantially as indicated. The upper end of the body portion 10 at one side is provided with a downwardly extending bore 12 within which is positioned a spring 13 (Fig. 6) and on which rests a ball or detent 14. A collar 15 is secured across the upper end of the bore 12 in suitable manner and serves to limit the outward displacement of the ball 14, as will be obvious.

The body portion 10 is provided with a longitudinally extending slit 16 therethrough extending from end to end for a purpose which will hereinafter become clear.

A handle 17 is suitably secured to the upper end of the body portion 10 and serves to connect the same to a pulling line 18 (Fig. 1).

The upper end of the body portion 10 receives downwardly therewithin an inner sleeve 19 extending substantially the length thereof (Fig. 2), the sleeve 19 at its upper end being integrally formed with an externally knurled flange 20 adapted to abut the upper end of the body portion 10. The flange 20 is provided with an enlarged conical bore 23 communicating with the central bore of the sleeve 19. The flange 20 and the sleeve 19 are provided with an elongated slot 21 extending the length thereof and adapted to be aligned with the slot 16 upon suitable rotation of flange 20, the sleeve 19 at its lower end being provided with an annular groove 24 for a purpose which will hereinafter become clear. It will be noted that the lower portion of the central bore of the sleeve 19 is beveled as at 23a. The undersurface of the flange 20 is provided with a recess 22 adapted to receive therewithin the ball 14 whereby to lock the position of the sleeve 19 relative to body portion 10.

A hollow cylindrical sleeve 25 is adapted to fit upwardly onto the recessed portion 11 of the body portion 10, the outside diameter of the sleeve 25 being substantially the same as the outside diameter of the body portion 10 (Fig. 2). The sleeve 25 is provided with a slot 26 extending longitudinally thereof and adapted to be aligned with the slot 16 and is integrally formed at its lower end with a plurality of radially spaced inwardly and upwardly bent prongs 27 which define a limited central opening at the lower end of the sleeve.

In order to secure the sleeve 25 to the recessed portion 11 of the body portion 10, the sleeve is provided with a plurality of radially spaced openings 28 adapted to be aligned with the internally threaded openings 29 provided in the recessed portion 11, the openings 28 and 29 being aligned with the annular recess 24.

Screws 30 pass through the openings 28 to be secured within openings 29, the inner ends thereof extending into the annular recess 24 whereby to permit rotational movement of the locking sleeve 19 while limiting its displacement relative to the body portion 10, longitudinally.

A link 31 is integrally formed at one end with an eye 32 for connection with the fishing line 33, the other end of the link 31 being integrally formed with an eye 34 connected to the eye 35 of the lure 36. A stop 37 is slidably mounted on the link 31 intermediate the eyes 32 and 34 and is adapted to pass snugly through the central opening of the lower end of the sleeve 25 defined by the inner ends of the prongs 27 when the link 31 is aligned longitudinally with the central longitudinal axis of the sleeve 25 (Fig. 2). The usual hooks 38 are pivotally connected to the lure 36.

When the locking sleeve 19 is rotated by means of flange 20 so that its slot 21 is aligned with the slots 16 and 26, the line 33 may be inserted into the central portion of the device and upon further rotation of the sleeve 19, firmly retained and locked therewithin for movement along the line 33. The device may then be lowered along the line 33 to the link 31 and snagged hook 38 which latter has become embedded in a log 39 or the like. As the device is lowered on the line, the enlargement 37 strikes the inner ends of the prongs 27, forcing the link 31 to center itself between the points of the prong and thus allowing it to pass inside the sleeve 25. Fig. 1 shows the lateral movement of the link 31 so that the stop 37 rests on the prongs 27 to one side with the link 31 passing downwardly therebetween. When tension is applied to the pulling cord 18, the prongs which straddle the link 31 and eye 35 are pulled tight behind the stop 37 and eye 32 and a steady pull can now be applied to the pulling cord 18 and increased until the snagged hook 38 of the fishing lure is pulled free of the object 39 into which it has been caught. It will be noted that the link 31 thus cooperates with the device by providing the prongs 27 with something to form a firm and automatic engagement with so that the snagged hook of the lure or plug can be pulled free from whatever it has caught upon. Thus, the link 31 provides a guarantee that should the hook or plug become snagged or something attached thereto which the retriever can be sent down the fish line to form a union with. Thus, any fisherman who adapts his fish line with the link 31 and retriever can purposely cast the lure plug among the most foreign and hidden objects, such as rocks, roots, logs or the like where the best fishing is often to be found with a guarantee that the snagged hook can be pulled free with a minimum of time and effort and without damage to the lure, plug or fish line.

While various changes may be made in the detail construction, it shall be understood that such changes shall be within the spirit and scope of the present invention as defined by the appended claims.

What I claim as new and desire to protect by Letters Patent of the United States is:

1. An article of the class described comprising a fishing line, a lure, a hollow, elongated body having a cylindrical bore therethrough from end to end, inwardly and upwardly extending, radially spaced prongs on the lower end of said body defining a limited central opening therethrough, said body having a longitudinal slit extending from end to end, an inner concentric sleeve received downwardly within said bore and rotatable therewithin, said body and concentric sleeve receiving downwardly therewithin said fishing line, means for rotating said sleeve, means for limiting the longitudinal displacement of said inner sleeve relative to said body, said inner sleeve having a longitudinal slot extending from end to end thereof and adapted to be aligned with said body slot to permit the insertion therewithin of said fishing line and to lock the latter therewithin upon further rotation of said inner sleeve, link means connecting said fishing line to said lure, said link means being adapted to pass upwardly through the central opening intermediate the inner ends of said prongs and to form a union with said prongs when displaced laterally, a pull line, and means for connecting one end of said pull line to the upper end of said body whereby to pull said body independent of the fishing line.

2. An article according to claim 1, said means for rotating said inner sleeve comprising a circular collar at the upper end of said sleeve in abutment with the upper end of said body portion, said collar being externally knurled.

3. An article according to claim 2, said body portion comprising an upper substantially cylindrical portion having a recessed annular portion at the lower end thereof, said recessed annular portion having a plurality of radially spaced, internally threaded openings therethrough, said inner sleeve at the lower end thereof having an annular recess adapted to be aligned with said radially spaced openings, said body portion further including a sleeve adapted to fit upwardly onto said recessed annular portion and having radially spaced openings aligned with said internally threaded openings, screws positioned within said aligned openings, the inner ends of said screws being received within said annular recess whereby to permit rotation of said inner sleeve and to prevent longitudinal displacement.

4. An article according to claim 3, said link means comprising an elongated link integrally formed at opposite ends with eyes, one of said eyes being connected to the fishing line, the other of said eyes being connected to the lure, and an enlargement on said link intermediate said eyes adapted to pass through the central opening defined by the inner ends of said prongs and to be received thereon when displaced laterally with said link passing through the space intermediate adjacent pairs of said prongs.

5. An article according to claim 4, including a downwardly extending bore at the upper end of said cylindrical body portion, a spring within said bore and a ball at the upper end of said spring, retaining means for receiving said ball therethrough, the undersurface of said flange having a recess adapted to receive said ball therewithin whereby to limit the rotational displacement of said inner sleeve.

6. An article according to claim 5, said pulling means comprising a loop shaped handle secured to said body portion near the upper end thereof, and a line connected at its lower end to said handle.

No references cited.